United States Patent
Corrado et al.

(10) Patent No.: US 8,054,160 B2
(45) Date of Patent: Nov. 8, 2011

(54) RFID TAG POWER CONSERVATION SYSTEM AND METHOD

(75) Inventors: Anthony P. Corrado, Nederland, CO (US); Rex T. Logan, Superior, CO (US)

(73) Assignee: Innovation Law Group, Ltd., Sequim, WA (US)

( * ) Notice: Subject to any disclaimer, the term of this patent is extended or adjusted under 35 U.S.C. 154(b) by 912 days.

(21) Appl. No.: 12/045,553

(22) Filed: Mar. 10, 2008

(65) Prior Publication Data
US 2008/0218351 A1    Sep. 11, 2008

Related U.S. Application Data

(60) Provisional application No. 60/894,152, filed on Mar. 9, 2007.

(51) Int. Cl.
*H04Q 5/22* (2006.01)
(52) U.S. Cl. .......... 340/10.1; 340/10.34; 340/10.4; 340/10.5; 340/10.51; 340/10.52; 340/572.4; 340/3.1; 340/3.2; 713/300; 713/310; 713/320; 713/321
(58) Field of Classification Search ............ 340/3.1, 340/3.2, 5.92, 10.1, 10.34, 10.41, 10.5–10.52, 340/539.22, 539.26, 572.1–572.8; 713/300, 713/310, 320–324, 330, 340, 375, 400, 401, 713/500–503, 600–601; 705/28
See application file for complete search history.

(56) References Cited

U.S. PATENT DOCUMENTS

| | | |
|---|---|---|
| 5,640,144 A | 6/1997 | Russo et al. |
| 5,742,914 A | 4/1998 | Hagenbuch |
| 5,774,876 A | 6/1998 | Woolley et al. |
| 6,104,295 A | 8/2000 | Gaisser et al. |
| 6,154,139 A | 11/2000 | Heller |
| 6,211,790 B1 | 4/2001 | Radomsky et al. |
| 6,493,649 B1 | 12/2002 | Jones et al. |
| 6,614,721 B2 | 9/2003 | Bokhour |
| 6,765,484 B2 | 7/2004 | Eagleson et al. |
| 6,838,992 B2 | 1/2005 | Tenarvitz |
| 7,295,108 B2 | 11/2007 | Corrado et al. |
| 2003/0227386 A1 | 12/2003 | Pulkkinen et al. |
| 2005/0040241 A1 | 2/2005 | Raskar |
| 2005/0206503 A1* | 9/2005 | Corrado et al. ............ 340/10.5 |
| 2006/0065489 A1 | 3/2006 | Oh et al. |
| 2006/0075269 A1* | 4/2006 | Liong et al. .................. 713/300 |

FOREIGN PATENT DOCUMENTS
WO    WO 0133748 A1    10/2001
* cited by examiner

*Primary Examiner* — George Bugg
*Assistant Examiner* — Sisay Yacob
(74) *Attorney, Agent, or Firm* — Innovation Law Group, Ltd.; Jacques M. Dulin, Esq.

(57) ABSTRACT

Active multi-modal RFID tags, illuminator/tag/reader systems, circuit architecture and opera-tional algorithms for battery power conservation that extends tag battery life from a typical 6 months to >5 years. The inventive system is particularly useful in asset and person tracking/inventory systems where power conservation is critical. The tag is configured with a micro-processor operational instruction set algorithm, modifiable on the fly via RF or IR, to synchro-nize a periodic tag awaken/sense envelope that overlaps the illuminator trigger pulse cycle and put the tag into deep, power conservation sleep for N periods of illuminator cycles. When the tag sees an illuminator signal with a different ID, or no illuminator signal at all, it transmits that anomaly via RF to a reader. This means the object or person with which the tag is associated has been moved out of the original illuminator field of view, permitting near real time investigation and tracking.

20 Claims, 2 Drawing Sheets

2A: Illuminator duty cycle

2B: Infra-red Receiver "On" cycle to check for presence of infra-red.

RFID TAG POWER CONSERVATION SYSTEM AND METHOD

CROSS-REFERENCE TO RELATED APPLICATION

This is the Regular U.S. Application of Provisional Application Ser. No. 60/894,152 filed by the same inventors under the same title on Mar. 9, 2007, the priority of which is claimed under 35 US Code Sections 119, 120 ff.

FIELD

The invention relates to active bimodal RFID tags, and more particularly to systems, circuit architecture and operational algorithms for conservation of battery power that extends the life of such tags, from a current life of about 6 months, to in excess of 5 years. Such tags are particularly useful in asset tracking and inventory systems in which power conservation is a key commercial criterion.

BACKGROUND

Radio Frequency Identification (RFID) applications are proliferating as the economies of automated tracking and identification are being realized by the global community. RFID systems of tags and readers provide the ability to detect, read, and/or write data to tags that are affixed to "things" and/or persons to track and further to transfer this data to another computer-related or controlled device for either data storage or action. Cost and utility of the RFID tag are the predominant parameters dictating applicability of this technology.

Hospitals are particularly interested in investing in this technology. Location tracking utilizes a system comprised of tags that respond to a location stimulator, a trigger device (trigger) that cause a tag to respond and readers which record the tag's output signal that indicates presence and location.

There are two types of RFID tags in the marketplace: passive and active tags. Passive tags convert energy transmitted to them from a reader into a reflected signal that radiates back to the initiating reader device to effect communications. If a metallic or water-laden object is in front of the signal, then the tags will be blocked and not work. Passive readers are large and cumbersome and best suited to fixed installations as field tag read and write capabilities require large readers and direct line of sight. Active tags perform very well but are higher in cost than passive tags and therefore are restricted to specific applications that can carry a higher unit cost.

Battery powered (active RFID) tags provide more functionality, features and reliability than can be realized from passive tags. However, the cost of replacing drained batteries far exceeds the cost of the product and can be the criteria for selection of one device over another. For instance, a battery powered tag can be purchased for $10.00, but the cost of replacing the battery, primarily due to the labor costs of locating, disassembly and battery replacement can be $30-$120.00.

As a new class of RFIDs, active (battery powered) bimodal RFID tags suggest promise for a wide range of usages, particularly for indoor applications such as equipment inventory and location. Such tags include both RF and IR communication transmitters, receivers or transceivers, depending on their configuration. However, since they are active tags, they have not had significant impact on the field as they are limited in life by their battery capacity. Current batteries offered Lithium Thionyl Chloride for extended life; Lithium Magnesium coin-type cells for inexpensive, shorter lived applications; Lithium Iron Phosphate and Lithium Ion types (more expensive); and Alkaline.

For currently available active bimodal RFID tags having both RF and IR transceivers, the battery life is on the order of only ~6-12 months for indoor use. This short battery life is due to the microprocessor instruction set algorithm awakening the tag from a partial power-down state to fully powered every 5 seconds for full processing of any signal detected. Typically, this process includes a scan of a few milliseconds (on the order of 1.5-2.5 msec) to detect an IR or RF signal. e.g., from an illuminator (also called a trigger device), and then an additional time period to fully process the signal for any identification information and signal message content to be acted-on. This frequent repeated cycling to full power to process all incoming signal information rapidly drains the battery, such that the battery must be replaced within ~6-12 months to insure continued operation. In typical enterprises, such as hospitals, offices, manufacturing facilities, retail or warehouse operation, research facilities and the like, thousands of such tags are required to implement the equipment inventory and location systems. In addition to the cost of replacement batteries, the necessary staff, record keeping and logistic requirements to keep track of battery check and change-out has created a serious financial barrier to the adoption of such tags for such inventory/location systems.

Although there are improvements in battery technology, there is currently nothing on the horizon that promises more than an incremental 10-20% increase in battery life, not enough to change the financial adoption equation for systems employing active bimodal RFID tags.

In addition, in current systems, the illuminator is always on. However, that not only burns out the power supply of the illuminator, but also causes totally unacceptable "black-out" interference with all other equipment that uses IR or RF to communicate, such as televisions, CD players, computer mice and keyboards, radios, networks, and other IR controllers for equipment, including medical and industrial equipment.

Accordingly, there is a need in the art for a paradigm shift in tag system architecture and functional wake-up and scan algorithms by which such tags operate so that currently available batteries can be used in a manner that they have operational life spans of 5-10 times the currently expected battery life.

THE INVENTION

Summary, Including Objects and Advantages

The invention is directed to active, battery powered, multimodal RFID tags having RF, IR, US (ultra-sound) and Laser receivers, transmitters or transceivers that are configured primarily for indoor operation, including novel circuit architecture and operational wake-up and scan algorithms for detection of periodic signal beacons from illuminators that result in significant and unexpected improvements in battery life. More particularly, the invention is directed to a paradigm shift in the operational algorithm, enabled in firmware and unique circuitry, that functions to conserve battery power of active, battery powered, bimodal RFID tags so that they have a useful, functional life on the order of 5 to 10 times longer than a tag powered by the same battery but not having the inventive system. The inventive tags are particularly useful when affixed to hard assets or personnel The inventive tags may be configured in several embodiments, e.g., considering a bimodal RF/IR RFID tag, by way of example: a) an RF transmitter and an IR receiver; b) an RF transceiver and an IR receiver; c) an RF transmitter and an IR transceiver; d) an RF transceiver and an IR transceiver; or e) an RF receiver and an IR transceiver. That is, the tags are bi-modal as to signal types, and at the same time are be uni-directional or bi-directional as to communication, In all cases, the tag is an active, battery powered tag. In the exemplary embodiments, the inventive tag has its wake up and scan algorithm configured for indoor use, but it should be understood that the principles of battery life extension and conservation of this invention can be applied to any active RFID tag, whether single RF or IR mode, bi-modal RF/IR, bi-modal RF/Laser, bi-modal IR/Laser, or tri-modal RF/IR/Laser, whether the tags are uni- or bi-directional, and whether for indoor or exterior applications.

In the principal and preferred embodiment, the inventive tags are part of a 3-part system: 1) a pulsed IR illuminator or RF illuminator acting as a tag stimulator or trigger that is mounted on infrastructure (buildings or vehicles) or mobile (vehicle or personnel-carried) and which are powered from a primary source, 2) the inventive tag; and 3) an RF reader comprising a receiver or transceiver that is capable of receiving the RF and/or IR signals from the tags through significant distances to function as a base or transfer station for data collection from the illuminator/tags in the field (area of use).

In the case of infrastructure-mounted triggers, the IR or RF triggers are designed to be mounted directly to 110V AC outlets from which they derive power. In the alternative, the IR triggers nay be mounted to walls, ceilings or other structural members, in which case they may be powered from DC transformers or obtain power via Ethernet devices or power-providing data cables.

The illuminator/trigger devices transmit an IR, RF, US or Laser signal that is encoded with information, including the trigger ID and commands to the tags to respond (or not) with an RF signal to the reader(s). The trigger devices (illuminators) employ IR or RF radiation cones (fields of view or fields of regard) that are adjustable in angular aspect and power, the latter defining the transmit range. These parameters determine, and thereby define a specific physical location. That is, the field of view, or, stated another way, the field of output coverage, of the trigger IR beam may be tailored to a particular room (or other space) type, size, configuration, surface material, or other parameter, so that the illuminator trigger device covers, and is therefore dedicated to, a particular location.

It should be noted that the IR signals are reflected off objects, and will bounce off walls, ceilings, objects in the space, and the like, such that an entire space (room) is illuminated by a single trigger device, when that function (full illumination by reflection) is desired. Thus, line of sight is not a limiting criterion for such devices or their placement. That is, the placement is not always critical, although it is important. As such, the illuminator ID (e.g., serial number or facility device number) can be correlated to a particular location in the facility. At least one tag is affixed to each asset that is desired to be located, accounted-for and tracked in the facility or to alert when it is moved from place to place within the facility, or removed from the facility. In the case wherein an RF or Laser illuminator is used to supplement, or replace the IR (infra-red) illuminator, the same principles apply as described above with one important exception in the case of RF. The RF illuminator trigger signal will penetrate objects such as purses, cartons or virtually all non-metallic surfaces. That is, such objects are transparent to RF signals of various frequencies. Consequently the RF illuminator will cause the tags to function even though they may be blocked from IR or Laser signal reception.

In this exemplary system, in contrast to the prior art where the illuminator is always on, the illuminator typically sends out at least one signal pulse train, in this example, an IR pulse (and/or including, its ID signature) every 1-2 minutes±a random value of up to about 10 seconds. The IR illumination pulse(s), is/are a beacon to all tags within range and field of view, that lasts on the order of 6 seconds. Each different illuminator has a different random repeat period, but the repeat timing of each illuminator is fixed and can be correlated to the particular illuminator. Thus, where each room, say in a hospital, has an illuminator plugged into a hard-wired standard 120V outlet, each illuminator has a unique ID signature, say a serial number, that is mapped to its location, and each has a unique beacon period, as compared to all other illuminators in the hospital system.

The RFID tag is configured to awaken each 5 seconds for from one to 2 ms to look for the illuminator beacon. However, as discussed in more detail below, unlike the currently available tags, the inventive tags do not, upon each awakening, fully process received illuminator signal content. Rather, the inventive tag merely looks repeatedly and regularly for the mere presence of a beacon pulse train (this can also be called continuously, but at a defined intermittent period or frequency of sensing "looks"). That is, the beacon pulse train is a long string of information bits/bytes, typically broken into multiple packets. There is at least a preamble, a string of data, and verification CRC in the train. In currently available tags, the tag must receive and process the entire complete train. If it awakens in the middle of a train, it must await and process the subsequent train to insure it has the complete train and data message before responding.

However, in the inventive system, when the tag awakens, it only looks for any aspect of the train, be it leading edge, some data byte or the end. When it detects the presence of the beacon train without processing it, the tag remains silent for the remaining portion of the 5 seconds. That is, it does not process the full signal and broadcast an RF signal back to the reader. As described in more detail below, the inventive tag repeats this "mere presence of signal detection" for N periods of illuminator pulse cycles (the periodic "Status Check-In" duration) before being fully awakened to process the entire beacon signal content.

In the event the tag does not see any portion of the illuminator beacon train during an interval longer than the illuminator period (the time between beacon pulses, e.g., 1-2 minutes that is preset in the inventive system), the tag alerts, via broadcasting an RF signal to the reader, that the beacon is missing or that it can't see the beacon signal. This means to the home base that the link between the tag and the illuminator has been interrupted. This is an anomalous event signal that is then investigated. For example, where the tag is on an expensive piece of equipment in an operating theatre of a hospital, the monitoring software in the home base correlates or maps the ID of the illuminator of that room with the ID of each tag placed on equipment that belongs in that room to be tracked. The continued silence of the tag during the Status Check-In period means that the equipment is still in the room where it is supposed to be, and all is well. Conversely, an anomaly signal, the tag reporting that it no longer sees the illuminator with that specific illuminator ID, means that the equipment has been moved, e.g., the equipment or person being tracked is out of the room or blocked from the field of view. If the tag does not shortly thereafter report-in by RF signal to the base station (via the reader) that it has picked up ("seen") a different illuminator ID, then the security staff is alerted to investigate. Thus, as long as the tag sees the particular illuminator ID, it goes back to sleep, or continues in deep sleep mode, for some preselected period, e.g., 5-20 minutes, as it "knows" it is still in the same room it is supposed to be.

In contrast to an always-on illuminator where the illuminator transmits for a second every other second, in the inventive system the illuminator/trigger may be a beacon, pulse-type illuminator in which it transmits a train once per minute (or other relatively long interval). The inventive tags are placed on selected equipment to be monitored. To implement the inventive power conservation operation, the tag is configured with an algorithm (operational instruction set in the microprocessor that may be configurable on the fly by RF and/or IR signal data) having one or more multiple decision path logic tree(s) that cause the tag to operate in accord with the following process:

1. The tags wake up periodically, typically every 5 seconds. During this wake up, the following events take place:
   a. The tag microprocessor supplies battery power to the IR receiver. This process typically takes 1.5 msec to achieve receiver stability.
   b. The microprocessor looks for the presence of any IR signal (this signal may be correct, incorrect, or noise). This process takes an additional 1.0-3.0 msec to process. If there is no IR signal present, then the microprocessor immediately goes back to sleep for the balance of the exemplary 5-second shallow sleep period. If there is an infra-red signal present, then it is processed further to determine the nature of the signal, any data in it, and the appropriate preprogrammed or configured response. This adds an additional 5.0 msec to the processing time. In addition, if this signal is the correct protocol, the microprocessor will typically take an additional 0.5-1.0 msec to fully capture a complete data stream.
2. The tags also have an embedded (software or firmware) operational instructional set algorithm that enables the tags to process a correct IR signal (IR signal of the proper protocol to which the tag is tuned or configured) according to the following logic.
   a. If the tag is not expecting an IR signal (has not processed a signal prior to this wake up cycle), then the tag will process the incoming IR data stream and will note the ID of the IR illuminator. The algorithm also causes the microprocessor to record the time of arrival of this data and save it to memory so that the IR illuminator's pulse period can be determined by the tag microprocessor after the receipt of a second IR signal from the same illuminator. If a second signal is received, then the period (interval) of the illuminator transmissions is calculated and stored in the tag memory. The tag can, immediately upon receipt of this second illuminator signal, switch to the power conservation mode of step 3 below. However, as a practical matter, the tags will often repeat this calculation for up to 10 times in order to ensure that the centralized database is updated with a sufficient number of data points to validate the illuminator pulse period and location ID. If the tag is not expecting an IR signal at the time it wakes up, and it does not receive any signal, then the periodicity counter is reset to zero. The tag continues to look for an incoming signal, and follows the period determination steps described above when it ultimately detects one.
   b. If the tag is expecting an IR signal, then after 2-10 cycles of receipt of IR signal pulses, it will enter a power conservation mode wherein it continues to awake for infra-red presence detection every 5 seconds. However, it will only draw enough power to stabilize the IR receiver, and process only so much of the incoming IR signal to know that a signal is present, approximately 2.5 msec of elapsed time. The tag will then re-enter the full power conservation (deep sleep) mode. In this mode, the tag will only waken and process a complete infra-red signal once every 20+ minutes. The period of deep sleep is configurable and changeable on the fly by RF signal from the reader or base (or a trigger if it includes one). If the illuminator ID has not changed, it will transmit an RF signal indicative of the illuminator ID location. Note: The inventive tags are capable of tracking multiple infrared illuminators in accord with the inventive algorithm and process. This is necessitated by the need for overlapping illuminators in certain locations such as hospital rooms with multiple bed locations. Each different illuminator has a different IR pulse period, and the tags can discriminate between them and the algorithm recognize two or more different periods by the illuminator ID data. Thus, as a non-limiting example, the tag can go into deep sleep for 10 minutes, awaken, see a first illuminator, then deep sleep for 11 minutes, see a second illuminator, deep sleep for 10 minutes, and so on alternately recognizing two tags, each with different pulse periods and IDs.
   c. If a tag awakens and is expecting an IR signal and does not receive one, the tag will increment a counter. After a preset number of counter increments, if the expected IR signal is not detected as present, the tag will interpret (determine) this condition as the tag having left the original IR field it was in. It will transmit a specific RF code indicative of it not being in a particular, repetitive IR field. That is the same as the tag saying it has lost contact with an illuminator having a unique ID, which in turn is mapped to a unique facility location. That is, the tag will report that it has been moved relative to the specific location it was originally mapped-to. Typically, the "lost-contact" code is "00". This code alerts the home base (server) that an item under tracking surveillance has left its previous IR field and has not entered a new IR field under a new IR illuminator ID. As soon as the tag re-enters a new IR illuminator field, the cycle of operational and method steps 2a, 2b & 2c is repeated. The tag creates a wake-up envelope of a plurality of sensing "looks" that will be of sufficient envelope duration to ensure it is awake during the illuminator transmission pulse. That is, the tag's awaken/sense envelope can be developed by the tag before or after the illuminator pulse, but is synchronized so the tag envelope overlaps the illuminator/trigger pulse. The tag may take 2 or more illuminator pulse cycles to achieve the synchronization, Once synchronized, the tag starts the awaken/sense presence envelope in synchrony with a first illuminator pulse, and then maintains the sleep mode for N illumination cycles, say on the order of 5-20 minutes (this is the "Status Check-In" period) before transitioning to the fully active mode wherein the tag processes the entire illuminator signal train and transmits status or other responsive information via RF to the receiver of the reader. The time duration between tag envelopes and the period of the Status Check-In are configurable in the hosting software in the home base and is broadcast by either IR or RF (in the case of bi-directional RF tags) to the tag to set the various intervals.

All tag sleep, envelope and Check-In intervals or periods are configurable from home base, that is may be settable and adjustable by user-selected entry in a configuration template. The tag reports the illuminator beacon period to home base so that the configuration of the tag intervals may be coordinated.

Thus, in accord with the inventive system and method, the tag creates a wake-up envelope of a plurality of beacon train presence-sensing "looks" that is synchronized to the pulse of the particular illuminator within its sensing range. The synchronization does not mean that the tag begins its wake up as the illuminator pulse is emitted. Rather, the awaken/sense presence envelope can be developed by the tag to begin before or after the illuminator pulse, but is synchronized so the envelope overlaps that pulse. Thus, for example, where the illuminator pulse is of 6 seconds duration, the tag's illuminator train presence-sensing envelope can be on the order of 4-7 seconds, starting before the illuminator pulse is emitted, or during the pulse. During the Status Check-In period, the tag goes through a series of sensing envelope cycles, 5 seconds sleep interval between 2 ms presence-sensings. The tag may take 2 or more illuminator pulse cycles to achieve the sensing envelope synchronization, Once synchronized, the tag starts the awaken/sense-presence envelope in synchrony with a first illuminator pulse, and then sleeps for N illumination cycles, say on the order of 5-20 minutes, the Status Check-In period. The time duration between tag envelopes is configurable in the hosting software in the home base and is broadcast by RF to the tag to set the tag sensing envelope and the Status Check-In intervals.

Since the tag is now "polling" (looking for) the presence of an illuminator signal only once every 5 seconds and transmitting (Status Check-In) only once every 5-20 minutes the battery drain is reduced and the life extended, in an actual test example, to on the order of 3.6 years, an improvement of 7-fold.

In a second embodiment, the tag includes an RC circuit comprising a resistor off the battery to a capacitor. When the capacitor charges, the microprocessor of the inventive bimodal RFID tag wakes up in response to the voltage build up in the capacitor and drains it. The battery then re-charges the capacitor through the resistor. This creates an oscillator circuit that functions as a timer. To reduce power drain the inventive circuit uses a solid state capacitor. This oscillator circuit using the sold state capacitor uses less power drain that the conventional clock circuit used in conventional, prior art, RFID tags. This timer is used to time the interval for the inventive bimodal RFID tag envelope event. The result for this second embodiment is to extend the battery life to 5.4 years, a more than 10-fold improvement over current tags.

By way of definition, the inventive tags have at least three distinct power modes: "Fully Active", during which the tag senses signals (including precursors), process them (including signal validation), polls or adds to memory, and communicates via one or more of the defined communication modes: IR, RF, Laser or US. That is the most power consumptive mode possible. "Deep Sleep" during which only the internal clock (oscillator and counter) is functioning. "Shallow Sleep" which is only sufficient "wake-up" (power-up from the battery) to send power to the IR sensor which takes milliseconds to stabilize and detect a pulse edge, and minimal power to the digital signal portion of the microprocessor chip to determine that a signal has been sensed ("seen"). Where the answer is "yes" the tag goes back to Deep Sleep, unless the tag clock is at the end of the N illuminator pulse cycle period that has been determined for that particular identified illuminator with which the tag is associated. Then the microprocessor algorithm (code structure) activates the tag to go into active mode. Thus, the tag, during the N-cycles Deep Sleep mode is cycling every Q seconds, in this example, every 5 seconds, between absolutely minimal power draw and a power draw level not much more than minimal. For example, Deep Sleep depending on tag configuration, may be on the order of 1 microamp, while Shallow Sleep may be on the order of 10 to 100 microamp, while Fully Active power may be 10 to 100 fold greater.

Stated another way: The tag microprocessor has several modes it uses to process IR (or RF, US or Laser) illuminator signals. The microprocessor firmware is set or configured to awaken the tag IR sensor periodically, typically every 5 seconds. It awakens on this period (frequency) for the duration of the tag's operating life. When it awakens the IR sensor, the sensor "looks" for IR illuminator signals (edges). For the first several illuminator cycles, the tag micro-processor processes these IR signals to "learn" the periodicity of the IR illuminator output (its pulse cycle). After the tag has accomplished this processing for the preset number of cycles, the tag microprocessor enters and cycles between two states of substantially reduced power: defined as "shallow" and "deep" sleep periods.

During the 5 second periods the tag is operating at a reduced power state of "deep sleep" at the end of which it awakens only partially to see if any IR signal is present. That is an awakening into "shallow sleep", which is only microseconds long. If the presence of an IR signal of any type is sensed, and in synch with the expected cycle or period of the illuminator to which the tag is initially associated, then the tag returns into the mode of "deep sleep" for the next period of 5 seconds. If the tag awakens the IR sensor in the "shallow sleep" microsecond period, and no IR signal is present of any type, then the tags will return to "deep sleep" but still awaken at the end of the next 5 second period.

The tag includes a clock (an oscillator) and a counter. The tag is configured so that the algorithm counts X sequential times that no-signal is sensed in the shallow sleep polling period. X is at least one tag shallow sleep wake-up more than the illuminator beacon pulse/train period. Thus X is on the order of 10 to 15 in this example of a 1-minute illuminator beacon period. When the counter goes to zero, the tag is awakened to full powered. The tag reports this anomaly to the reader via RF signal, and appropriate inventory tracking investigation and retrieval action can be initiated.

At the end of the N cycles, the tag is fully powered, processes signal and reports in. Then the deep-sleep/shallow-sleep cycle repeats.

Of course, in certain locations, such as exit doors, the illuminator may be an always-on type. Alternatively, two illuminators may be posted at exit doors or in exit halls, loading docks, exit lobbies and the like so that the inventive tag reporting two illuminator IDs to the reader is a precise alert that the equipment or person is leaving the building.

BRIEF DESCRIPTION OF THE DRAWINGS

The invention is described in more detail with reference to the drawings, in which:

FIG. 2 is a schematic diagram of the illuminator pulse and tag sensing envelope, in which FIG. 2A shows the illuminator IR pulse sending operation, and FIG. 2B shows the inventive tag sensing in two modes, Mode A—No Processing on the left where no IR beacon is detected, and Mode B—Signal Processing, on the right where an IR beacon is detected.

DETAILED DESCRIPTION, INCLUDING THE BEST MODES OF CARRYING OUT THE INVENTION

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention, including what is presently believed to be the best modes of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

All publications, patents and applications cited in this specification are herein incorporated by reference as if each individual publication, patent or application had been expressly stated to be incorporated by reference.

Figure 1:
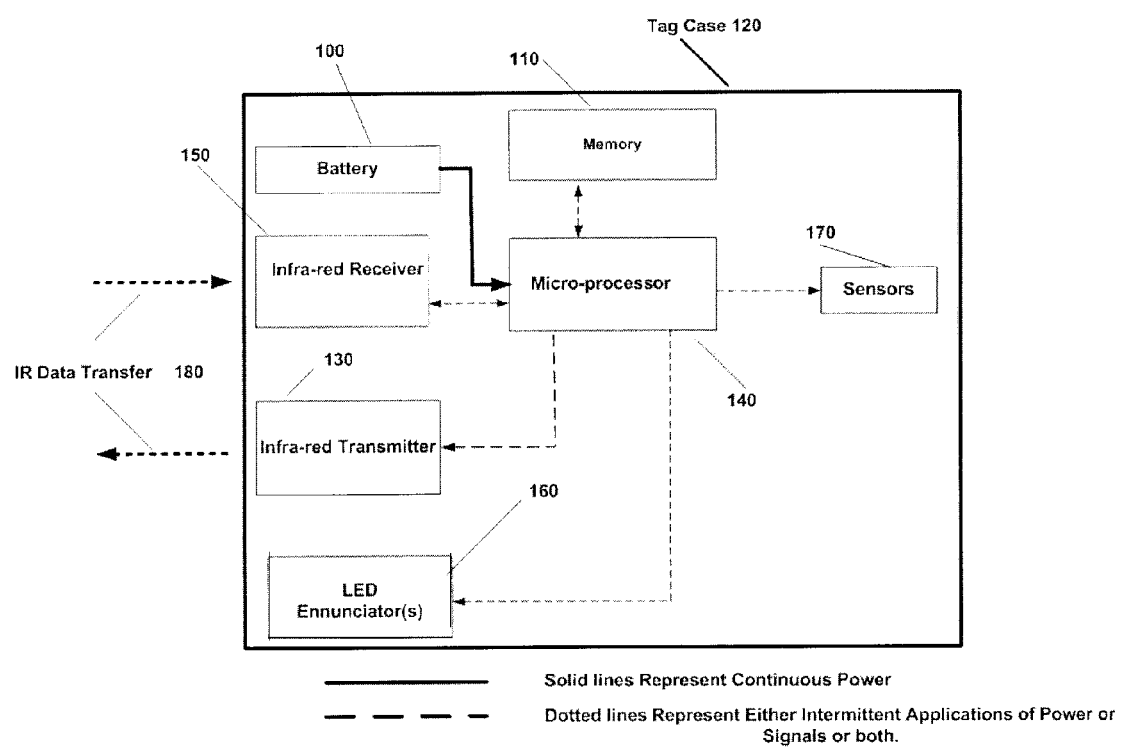
FIG. 1 is a schematic diagram of an exemplary system of the invention employing the inventive active bimodal RFID tags having extended battery life pursuant to the power conservation algorithm of the inventive method.

With reference to FIG. 1, the elements comprising several functional variations of the inventive tag 10 are shown in this figure. All of the devices comprising the inventive tag in a system are bimodal, incorporating both infra-red receivers and infra-red transmitter(s). The tags also incorporate RF transmitters or RF transceivers. That is, they are preferably both bimodal and bidirectional, send and receive. The readers incorporate both.

The tag 10 comprises a case or housing 120 enclosing a PC board on which is mounted a microprocessor 140, powered by battery 100. The tag also includes a memory module 110, with which the microprocessor communicates bi-directionally. The IR receiver 230 receives incoming IR information and data signals 210 from at least one illuminator/trigger (not shown) and passes these signals to the microprocessor for processing pursuant to the inventive functional algorithm in firmware. The microprocessor can also sample data from sensors 190, such as temperature, humidity, radiological or biometric data. The microprocessor also output a reply or query signal to IR transmitter 130. In addition, the microprocessor can activate LED 180 to act as an annunciator, e.g., one or more pulses of light, or switch to ON or OFF state, depending on the meaning to be attached to the LED illumination. For example, in a field of many RFIDs, when a selected one receives a signal 210 from an illuminator trigger (e.g., a hand held trigger device) that is uniquely encoded to it, the microprocessor can activate the tag LED to send one or more "recognition" or "confirmation" light flashes, so the person triggering the illuminator/trigger device knows which of the many tagged assets in the field of view has been selected. This process is called "singulation", that is, a system for singling out of many tagged assets a particular one in a manner that the user knows which one has been singled-out.

In addition, an RF transceiver 160, having an RF frequency control crystal 250, or utilizing an internally-generated frequency control methodology, can send out and receive radio signals via antenna 170 on specific frequencies determined by the crystal, to a reader (which can be in the trigger device), a home base device (e.g., monitoring server), or the like.

The illuminator trigger devices are encoded (written-to after installation via a handheld device such as a PDA) with physical location information, such as the room #, floor # value, wing ID value and type of location (nurse station). This information is transmitted with every string of signals from the trigger devices. The tags receive this data and add to it their particular factory set tag identification value. They then transmit this new string of data to the RF reader via an RF radio link.

The illuminator trigger devices have multiple infra-red LED transmitting elements which can be regulated as to their transmission energy levels. These power levels determine the effective range, including reflected signals, that the infra-red energy can travel. Thus adjusting infra-red power levels to a lesser value decrease the coverage (Field of Regard or Field of View) that is encompassed by a trigger device. This enables the coverage zone to be restricted to, for example, a bed and adjacent surrounding areas. The trigger devices also contain a second set of infra-red LEDs which utilize a restricted field of infra-red energy transmission, for example 7° at the half power point. These are also adjustable as to power. Consequently, the trigger devices can be adjusted to cover a very precise and limited volume or a very large cone.

Because there may be other infra-red controlled devices (e.g., TVs, etc.) in the same volume as the infra-red triggers, the triggers are duty cycled to minimize interference. In this exemplary application, the illuminators transmit an encoded infra-red signal once every 120 seconds. This precise value is calculated as 120 seconds+a random value (calculated based on illuminator unique ID value)+a jitter factor of time. This attribute assures that whenever the illuminator is installed or re-powered, each illuminator duty cycle is uniquely different from all other illuminators that may installed in the same infrastructure area (room).

Figure 2:
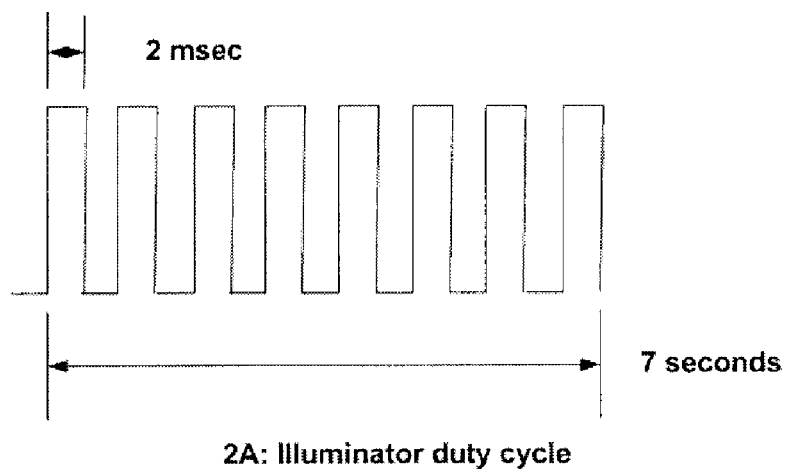
Figure 2:
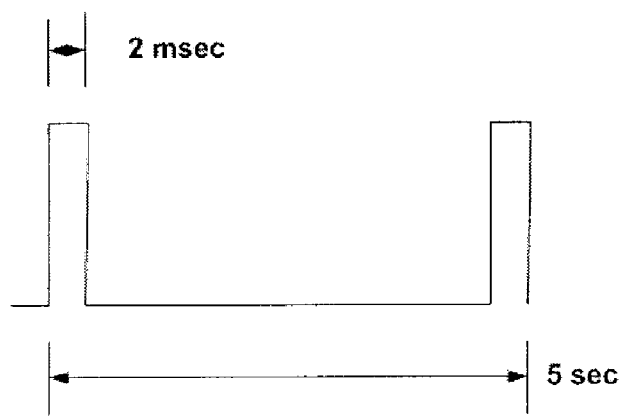

In accord with the invention, the illuminator/trigger transmits an encoded IR pulse stream in which the signal is repeated only for a limited-duration of illuminator "on time", on the order of 6-7 seconds, then is silent for on the order of 120 seconds±an intentional jitter time factor. This cycle is illustrated in FIG. 2A. The 6-7 second "on time" is sufficient to ensure that a complete overlap of transmission signal (leading edge pulse to trailing edge pulse) overlaps the tag's "ON" decoding (reception) time.

The tags are battery powered. In order to detect an IR signal they must provide power for the IR receiver. The tag IR receivers consume significant DC power as does the microprocessor which controls, decodes and transmits a corresponding RF signal. It is essential therefore to minimize the "ON time" for the IR receiver and for the microprocessor. In FIG. 2B, the tag's "ON" time is illustrated in two modes.

In Mode A—Limited Processing: Referencing the left of FIG. 2B, the tag wakes up, powers the IR receiver and looks for the presence of an encoded IR signal once every 5 seconds. If no IR signal is present on wake up, the tag reverts immediately to a sleep state after, for example, 2 ms (milliseconds). The tag stays in this mode, waking up every 5 seconds. As described above if the tag is supposed to see a signal and does not, after several Mode A cycle repeats, e.g., on the order of several minutes, the tag RF can be triggered to send an anomalous condition detected signal to the base for action by the facility or monitoring staff.

In Mode B—Signal Processing: Referencing the right of FIG. 2B, if an IR signal is detected by the tag, then the IR receiver is cycled by the microprocessor to remain "ON" long enough to determine if the IR signal is valid or invalid. If any IR signal is present, (noise as well as encoded signal from a correct or different protocol device), then the tag will process the signal. The process time is approximately 2-3 ms. If the proper illuminator IR signal is present then the tag will process that signal in approximately 5 ms. As shown, the total process time is on the order of 7 ms. The tag sleeps for on the order of 5 seconds and repeats the wake-up, sense and process operations, illustrated as a pulse in the diagram.

In normal operation, the Mode B—Signal Processing is the initial mode of the tag. When it sees an IR signal from an illuminator, it processes to determine the illuminator ID number. The tag micro-processor can check its memory to determine if that is the ID it is assigned to see, also known as the "correct" illuminator. Or it can send out an RF signal reporting the ID number, and receive back instructions to track that ID number (or not). Where the ID is correct, the tag starts its clock (the RC oscillator circuit 200 of FIG. 1 described above). The every-5 second wake up Mode B continues until the tag sees all or a portion of the 6-7 second pulse train from the illuminator a number of repeated cycles, say on the order of 2 minutes±a jitter factor (the illuminator pulse train period) that is measured by the tag RC clock circuit.

Once the tag verifies that the ID is from the correct illuminator, it can then go immediately into Mode A, look every 5 seconds but does not process any signal for N times the measured illuminator pulse train period as described above. That is the deep sleep period. Or the tag may continue in Mode B for one or more additional illuminator pulse train periods to verify the period length calculated on the first two pulse trains, and then goes into periodic deep sleep.

In both cases, the tag stops responding with RF transmissions and the processing of IR signal it sees for the deep sleep period for N illuminator periods. Thus, for the deep sleep period, even though the tag sees IR pulse trains on the order of every 1-2 minutes, it does not fully process them to determine ID or other data. At the end of the deep sleep period, the tag reverts to Mode B processing. If it sees the same ID, it returns to deep sleep. If it sees an unexpected ID, one that does not correlate to the ID it is supposed to see, the tag processes the ID and may report via RF or adjust its sensing period to the new cycle (n times the pulse train period of the new illuminator ID).

The battery energy conservation arises from the difference between Mode A and Mode B. Note that the area under the "curves" illustrating the sensing "pulses" in FIGS. 2A and 2B represent energy expended, the vertical axis being power, and the horizontal axis, time. Thus, the difference in the wave or pulse forms 2B minus 2A represents the energy savings of mode 2A over 2B. Since the processing in Mode 2B takes about 5 of the 7 ms, the savings is 5/7 or 71% in Mode A. Thus, the tag, operating to only look for signal presence but not processing during deep sleep Mode A functionality, is running on under about 30% energy drain for on the order of 90% of the time.

INDUSTRIAL APPLICABILITY

It is clear that the inventive system, tags and operational battery conservation algorithm of this application has wide applicability to the RFID industry, namely to asset tracking and the like. The system clearly will be adopted by hospitals for asset location, inventory and tracking. Thus, the inventive system provides utility in long life RFID tags, and has the clear potential of becoming adopted as the new standard for systems, circuits and methods of conservation of battery power for such devices and the systems in which they function.

It should be understood that various modifications within the scope of this invention can be made by one of ordinary skill in the art without departing from the spirit thereof and without undue experimentation. For example, the illuminators, RFID tags and readers can have a wide range of designs to provide the functionalities disclosed herein. Likewise the batteries may be of any future chemistry utilized for batteries, and is not limited to Li-ion or related type batteries. This invention is to be defined by the scope of the appended claims as broadly as the prior art will permit, and in view of the specification if need be, including a full range of current and future equivalents thereof.

APPENDIX

This Parts List is provided as an aid to Examination and may be canceled upon allowance)

| | |
|---|---|
| 10 Inventive bimodal tag | 68 |
| 100 Battery | 70 |
| 110 Memory module | 72 |
| 120 Tag case | 74 |
| 130 IR transmitter | 76 |
| 140 Microprocessor | 78 |
| 150 | 80 |
| 160 RF transciever | 82 |
| 170 Antenna | 84 |
| 180 LED annunciator | 86 |
| 190 Sensors | 88 |
| 200 RC clock circuit | 90 |
| 210 IR data transfer to/from trigger/illuminator | 92 |
| 220 RF data transfer | 94 |
| 230 IR receiver | 96 |
| 240 | 98 |
| 250 RF frequency control crystal | 100 |
| 260 | 102 |
| 270 | 104 |
| 280 | 106 |
| 290 | 108 |
| | 110 |
| 54 | 112 |
| 56 | 114 |
| 58 | 116 |
| 60 | 118 |
| 62 | 120 |
| 64 | 122 |
| 66 | 124 |

The invention claimed is:

1. A method of conservation of battery power of an active, multi-modal Radio Frequency IDentification (RFID) tag in a system having a device including illuminator and/or reader functionality, and where said device has only illuminator functionality, a second device having reader functionality, said tag being associated with an asset or person to be tracked and including a microprocessor, a memory device, a battery, an illuminator signal sensor receiver and a transmitter, said method comprising the steps of:
   a) actuating said illuminator device to provide repeated cycles of output beacon trigger signal pulses of a first mode and of a selected duration within a field of view comprising a field of output coverage, said pulses having a fixed repeat period;
   b) actuating said tag to wake up periodically to identify said illuminator trigger signal pulse of said first mode type;
   c) determining the pulse cycle period of said identified illuminator trigger signal to create a periodic awaken/ sense envelope for said tag comprising a tag awake period of sufficient duration to ensure it is awake to sense said identified illuminator trigger signal during at least a portion of said identified illuminator trigger signal pulse duration;

d) synchronizing said tag awaken/sense envelope to periodically overlap said identified illuminator trigger pulse cycle; and e) actuating said tag to go into battery-conserving low power consumptive mode for N periods of said identified illuminator pulse cycles before re-awakening to sense and demodulate said entire illuminator signal to confirm identity of said illuminator trigger signal pulse whereby said battery life is extended from current life on the order of 6-months to on the order of several years.

2. A method of conservation of battery power as in claim 1 wherein said N periods have a time duration in the range of from about 5 to about 20 minutes.

3. A method of conservation of battery power as in claim 2 wherein said system is bi-modal, said modes being selected from Radio Frequency (RF), InfraRed (IR) and Laser.

4. A method of conservation of battery power as in claim 3 wherein said modes are IR and RF, said illuminator trigger signal is IR, said tag sensor is an IR receiver, said tag includes an RF transmitter and said reader includes an RF receiver.

5. A method of conservation of battery power as in claim 1 wherein said illuminator trigger signal includes an illuminator IDentification (ID) by which said tag identifies said illuminator, and which includes the added steps of said tag saving in memory said ID as a first ID with which said tag is initially associated, said battery-conserving step e) is repeated if said tag, upon said re-awakening, senses and processes said illuminator trigger pulse to determine that said illuminator ID matches said first ID.

6. A method of conservation of battery power as in claim 5 wherein said tag communicates with said reader via said tag transmitter in a second mode of communication.

7. A method of conservation of battery power as in claim 5 which includes the added step of sending an anomaly signal to said reader when said tag determines that said illuminator ID does not match said first ID, or said tag does not sense an illuminator signal of said first mode type.

8. A method of conservation of battery power as in claim 7 which includes the step of awakening said tag periodically to provide just sufficient power for the tag receiver to sense the presence or not of a first mode signal from an illuminator without processing said illuminator trigger signal to determine the ID of the illuminator or the content of the signal, said sensing power awakening taking place during the N periods of deep sleep.

9. A method of conservation of battery power as in claim 8 which includes the step of continuing said periodic sensing-power-only awakening throughout said N periods cycle of deep sleep, and said tag awakens out of said deep sleep to sense and process said illuminator signal after said N periods cycle.

10. A method of conservation of battery power as in claim 9 which includes the alternative steps of: where said illuminator signal processed after said N periods cycle matches said first ID said tag reverts to deep sleep; and where said illuminator signal processed after said N periods cycle has a second ID that does not match said first ID and said anomaly signal is sent, said steps c), d) and e) are repeated for the illuminator having said second ID.

11. A method of conservation of battery power as in claim 5 wherein a no-signal detected anomaly signal is sent to said reader after said tag fails to sense a trigger signal after a preselected number of no-signal detection events during successive awakenings.

12. An improved microprocessor structure for a multi-modal Radio Frequency IDentification (RFID) tag in a system having a device including illuminator and/or reader functionality, and where said device has only illuminator functionality, a second device having reader functionality, said tag being associated with an asset or person to be tracked and including a microprocessor, a memory device, a battery, an illuminator signal sensor receiver and a transmitter, said tag microprocessor having at least one operational instruction set comprising code structure:

a. to actuate said tag to wake up periodically to identify an illuminator trigger signal pulse of a first mode type;

b. to actuate said tag to determine the pulse cycle period of the identified illuminator trigger signal to create a periodic awaken/sense envelope for said tag comprising a tag awake period of sufficient duration to ensure it is awake to sense said identified illuminator trigger signal during at least a portion of said identified illuminator trigger signal pulse duration;

c. to actuate said tag to synchronize said tag awaken/sense envelope to periodically overlap said identified illuminator trigger pulse cycle; and d. to actuate said tag to go into battery-conserving deep sleep for N periods of said identified illuminator pulse cycles before re-awakening to sense and confirm identity of said illuminator trigger signal pulse whereby said battery life is extended from current life on the order of 6-months to on the order of several years.

13. An improved microprocessor as in claim 12 wherein said code structure is configurable on the fly via a second communication mode between said tag and at least one of said reader and said illuminator.

14. An improved microprocessor as in claim 13 wherein said illuminator trigger signal includes an illuminator IDentification (ID) by which said tag identifies said illuminator, and said code structure actuates said tag to save said ID in said tag memory as a first ID with which said tag is initially associated, said code structure actuating said tag, upon said re-awakening, to sense and process said trigger pulse to determine that said illuminator ID matches said first ID and to re-enter said deep sleep mode when that condition is met.

15. An improved microprocessor as in claim 14 wherein said code structure actuates said tag to transmit via said transmitter in a second communication mode an anomaly signal to said reader when said tag determines that said illuminator ID does not match said first ID, or said tag does not sense an illuminator signal of said first mode type.

16. An improved microprocessor as in claim 15 wherein: said code structure actuates said tag to awaken periodically to provide just sufficient power for the tag receiver to sense the presence or not of a first mode signal from an illuminator without processing said illuminator trigger signal to determine the ID of the illuminator or the content of the illuminator signal, said sensing power awakening taking place during the N periods of deep sleep; said code structure actuates said tag to determine if the illuminator signal processed after said N periods cycle has a second ID that does not match said first ID, said anomaly signal is sent to said reader and said tag is actuated with respect to said second illuminator and its ID to determine that illuminator pulse cycle, to synchronize a tag sense/awaken envelope with respect thereto, and to enter a deep sleep with respect to N cycles of said second illuminator pulse cycles; and said code structure actuates said tag to send a no-signal detected anomaly signal to said reader after said tag fails to sense a trigger signal after a preselected number of no-signal detection events during successive awakenings.

17. Active, battery powered multi-modal Radio Frequency Identification (RFID) tags for use in systems having a device including illuminator and/or reader functionality, and where said device has only illuminator functionality, a second device having reader functionality, said tag being associated with an asset or person to be tracked comprising in operative combination:
- a) a circuit including elements of a receiver for receiving at least one signal from a device having illuminator functionality including a first mode signal transmitter selected from InfraRed (IR), Radio Frequency (RF), Ultra-Sound (US) and Laser communication signals, a microprocessor for processing said signals and having tag operational instruction set code, a receiver for receiving said first mode illuminator communication signals, a memory, a battery, and a transmitter for transmitting second mode communication signals selected from IR, RF, US and Laser to a device having reader functionality with a receiver capable of receiving said second mode communication signals from said tag; and
- b) said microprocessor having at least one operational instruction set comprising code structure:
  - i) to actuate said tag to wake up periodically to identify an illuminator trigger signal pulse of said first mode type;
  - ii) to actuate said tag to determine the pulse cycle period of the identified illuminator trigger signal to create a periodic awaken/sense envelope for said tag comprising a tag awake period of sufficient duration to ensure it is awake to sense said identified illuminator trigger signal during at least a portion of said identified illuminator trigger signal pulse duration;
  - iii) to actuate said tag to synchronize said tag awaken/sense envelope to periodically overlap said identified illuminator trigger pulse cycle; and
  - iv) to actuate said tag to go into battery-conserving deep sleep for N periods of said identified illuminator pulse cycles before re-awakening to sense and confirm identity of said illuminator trigger signal pulse whereby said battery life is extended from current life on the order of 6-months to on the order of several years.

18. Active, battery powered multi-modal RFID tag as in claim 17 wherein said illuminator trigger signal includes an illuminator IDentification (ID) by which said tag identifies said illuminator, and said code structure actuates said tag to save said ID in said tag memory as a first ID with which said tag is initially associated, said code structure actuating said tag, upon said re-awakening, to sense and process said trigger pulse to determine that said illuminator ID matches said first ID and to re-enter said deep sleep mode when that condition is met.

19. Active, battery powered multi-modal RFID tag as in claim 18 wherein said code structure actuates said tag to transmit via said tag transmitter in a second communication mode an anomaly signal to said reader device when said tag determines that said illuminator ID does not match said first ID, or said tag does not sense an illuminator signal of said first mode type.

20. Active, battery powered multi-modal RFID tag as in claim 19 wherein said code structure actuates said tag to awaken periodically to provide just sufficient power for the tag receiver to sense the presence or not of a first mode signal from an illuminator without processing said illuminator trigger signal to determine the ID of the illuminator or the content of the illuminator signal, said sensing power awakening taking place during the N periods of deep sleep; said code structure actuates said tag to determine if the illuminator signal processed after said N periods cycle has a second ID that does not match said first ID, said anomaly signal is sent to said reader and said tag is actuated with respect to said second illuminator and its ID to determine that illuminator pulse cycle, to synchronize a tag sense/awaken envelope with respect thereto, and to enter a deep sleep with respect to N cycles of said second illuminator pulse cycles; and said code structure actuates said tag to send a no-signal detected anomaly signal to said reader after said tag fails to sense a trigger signal after a preselected number of no-signal detection events during successive awakenings.

* * * * *